US012580964B2

(12) United States Patent
Authement et al.

(10) Patent No.: US 12,580,964 B2
(45) Date of Patent: Mar. 17, 2026

(54) OPTIMIZATION FOR ACCESS POLICIES IN COMPUTER SYSTEMS

(71) Applicant: International Business Machines Corporation, Armonk, NY (US)

(72) Inventors: Shawn Patrick Authement, Round Rock, TX (US); Edward Shvartsman, Austin, TX (US); Natalie Isabelle Tagher, Philadelphia, PA (US); Nicholas James Xitco, Austin, TX (US); Dhruv Maniktala, Damascas, MD (US); Aeddon Liu Chipman, Helotes, TX (US); Ben Lopez, Austin, TX (US)

( * ) Notice: Subject to any disclaimer, the term of this patent is extended or adjusted under 35 U.S.C. 154(b) by 781 days.

(21) Appl. No.: 17/826,942

(22) Filed: May 27, 2022

(65) Prior Publication Data

US 2023/0388348 A1    Nov. 30, 2023

(51) Int. Cl.
*H04L 9/40* (2022.01)

(52) U.S. Cl.
CPC ............ *H04L 63/20* (2013.01); *H04L 63/101* (2013.01); *H04L 63/104* (2013.01)

(58) Field of Classification Search
CPC ...... H04L 63/20; H04L 63/101; H04L 63/104
USPC .......................................................... 726/1
See application file for complete search history.

(56) References Cited

U.S. PATENT DOCUMENTS 8,490,152 B2    7/2013  Staiman et al.
9,491,116 B2    11/2016  Pugh 9,954,907 B2 *  4/2018  Denker ............... H04L 65/1069
10,360,264 B2 *  7/2019  Movsisyan ........... H04L 63/102
10,607,022 B2    3/2020  Kling et al.
(Continued)

FOREIGN PATENT DOCUMENTS

CN         103115742  A  *  5/2013  .............. G01M 7/00
CN         104995598  A  *  10/2015  ......... G06F 21/6218
WO    WO-2019227084 A1 * 11/2019  .............. G06N 5/022

OTHER PUBLICATIONS

Leigh Griffin et al., "On the performance of access control policy evaluation", 2012 IEEE International Symposium on Policies for Distributed Systems and Networks, IEEE, 2012, 8 pages.
(Continued)

*Primary Examiner* — Aubrey H Wyszynski
(74) *Attorney, Agent, or Firm* — Lily Neff

(57) ABSTRACT

Disclosed embodiments provide systems and methods for analyzing and optimizing access policies. Access policies are analyzed by an access policy optimization system. In cases where large numbers of users have similar access privileges, the number of overall policies can be significantly reduced. An access control health metric is computed on an original set of access data as a measure of the current state of the access policies. It can be used as an indication that optimization of the access policies is warranted. The access data can include access policies and/or access groups. A policy subgroup mapping process is performed to identify subgroups of access policies. Subgroups with a number of entries exceeding a predetermined value are converted to access groups, the users that have those policies are added to the corresponding access groups, and the individual access policies are deleted. Duplicative and/or redundant policies are identified and removed.

20 Claims, 8 Drawing Sheets

(56) References Cited

U.S. PATENT DOCUMENTS

| | | |
|---|---|---|
| 2006/0161785 A1 | 7/2006 | Conner et al. |
| 2012/0102489 A1 | 4/2012 | Stairman et al. |
| 2015/0156139 A1 | 6/2015 | Pugh |
| 2017/0163684 A1* | 6/2017 | Brucker ............... H04L 63/20 |
| 2017/0214529 A1 | 7/2017 | Oliveira et al. |
| 2018/0060602 A1* | 3/2018 | Horvitz ............. H04L 12/1827 |
| 2019/0251276 A1 | 8/2019 | Kling et al. |
| 2019/0258811 A1 | 8/2019 | Ferraiolo et al. |

OTHER PUBLICATIONS

V. Nirmalrani et al., "A Dynamic Access Control Framework for Database Security", researchgate.net, Printed May 11, 2022, 10 pages.

Stefan Bleuler et al., "Multiobjective Genetic Programming: Reducing Bloat Using SPEA2", Proceedings of the 2001 Congress on Evolutionary Computation (IEEE Cat. No. 01TH8546), vol. 1, IEEE, 2001, pp. 536-543.

Keshnee Padayachee et al., "An Aspect-Oriented Approach to Enhancing Multilevel Security with Usage Control: An Experience Report", IMECS, 2007, 6 pages.

Nick Xitco, "ABAC Policy Reduction with Subgroup Set Cover", Aug. 19, 2020, 8 pages.

Sandhu, Ravi, 1996. Proceedings of the first ACM Workshop on Role-based access control. Association for Computing Machinery, New York, NY, USA, https://dl.acm.org/doi/proceedings/10.1145/270152, 7 pgs.

Backes, J. et al. (2020). Stratified Abstraction of Access Control Policies. In: Lahiri, S., Wang, C. (eds) Computer Aided Verification. CAV 2020. Lecture Notes in Computer Science(), vol. 12224. Springer, Cham. https://doi.org/10.1007/978-3-030-53288-8_9, 12 pgs.

Lin, Dan et al., "EXAM—a Comprehensive Environment for the Analysis of Access Control Policies", https://citeseerx.ist.psu.edu/viewdoc/summary?doi=10.1.1.158.6527, 23 pgs.

Unknown, "Analyze IAM policies", https://cloud.google.com/asset-inventory/docs/analyzing-iam-policy, May 23, 2022, 12 pgs.

Unknown, "Policy Simulator Overview", https://cloud.google.com/iam/docs/understanding-simulator, May 23, 2022, 8 pgs.

Unknown, "Troubleshoot IAM Permissions", https://cloud.google.com/iam/docs/troubleshooting-access, May 23, 2022, 8 pgs.

Unknown, "Overview, Recommender Documentation", https://cloud.google.com/recommender/docs/overview, May 23, 2022, 3 pgs.

Bruns, Glenn, "Access-Control Policies via Belnap Logic: Effective and Efficient Composition and Analysis", IEEE Xplore, Jul. 2008, 15 pgs.

Gofman, Mikhail I., et al., "RBAC-PAT: A Policy Analysis Tool for Role Based Access Control", Tools and Algorithms for the Construction and Analysis of Systems. TACAS 2009. Lecture Notes in Computer Science, vol. 5505, 4 pgs.

Jayaraman, Karthick et al., "Automatic Error Finding in Access-Control Policies", Computer Science and Artificial Intelligence Laboratory Technical Report, May 5, 2010, 14 pgs.

Bonatti, Piero, "An Algebra for Composing Access Control Policies", ACM Transactions on Information and System Security, vol. 5, No. 1, Feb. 2002, pp. 1-35.

Qian, Jiang, ACLA: A Framework for Access Control List (ACL) Analysis and Optimization, Communications and Multimedia Security, 2001, 15 pgs.

Pugalia, Ujjwal, "Automate analyzing your permissions using IAM access advisor APIs", AWS Identiy and Access Management (IAM), Security, Identity, & Compliance, Dec. 10, 2018, 3 pgs.

Kolovski, Vladimir et al., "Analyzing Web Access Control Policies", WWW 2007, May 8-12, 2007, pp. 677-686.

Zhang, Nan et al., "Evaluating Access Control Policies Through Model Checking", ISC 2005. Lecture Notes in Computer Science, vol. 3650, 2005, 15 pgs.

Fisler et al., "Verification and Change—Impact Analysis of Access-Control Policies", Proceedings. 27th International Conference on Software Engineering, 2005. ICSE 2005, Dec. 2005, 10 pages.

Hawblitzel et al., "Ironclad Apps: End-to-End Security via Automated Full-System Verification", OSDI'14: Proceedings of the 11th USENIX conference on Operating Systems Design and Implementation, Oct. 6, 2014, pp. 165-181.

* cited by examiner

Figure 4:
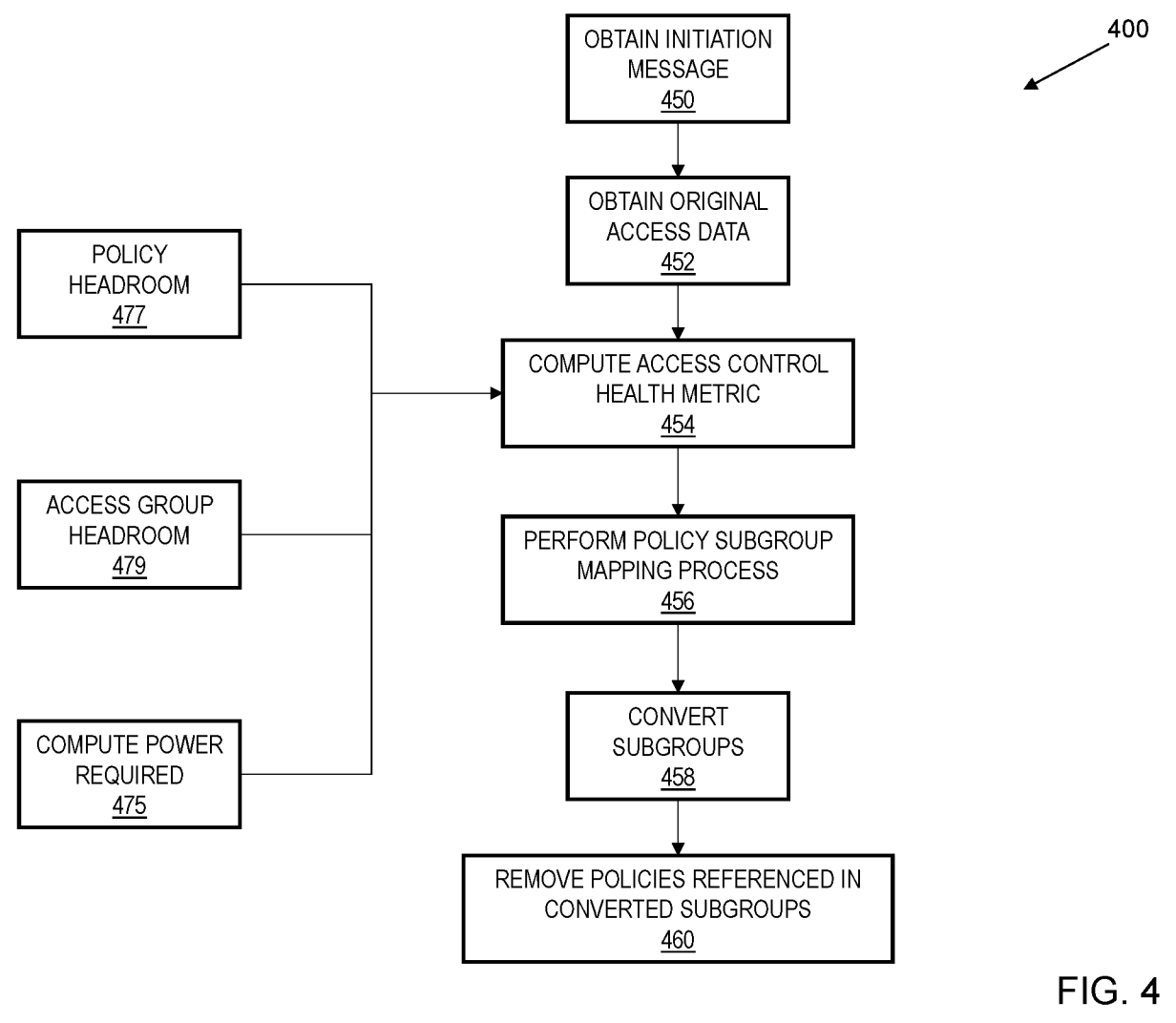

OBTAIN INITIATION
MESSAGE
450

OBTAIN ORIGINAL
ACCESS DATA
452

COMPUTE ACCESS CONTROL
HEALTH METRIC
454

PERFORM POLICY SUBGROUP
MAPPING PROCESS
456

CONVERT
SUBGROUPS
458

REMOVE POLICIES REFERENCED IN
CONVERTED SUBGROUPS
460

POLICY
HEADROOM
477

ACCESS GROUP
HEADROOM
479

COMPUTE POWER
REQUIRED
475

OPTIMIZATION FOR ACCESS POLICIES IN COMPUTER SYSTEMS

FIELD

The present invention relates generally to computer systems, and more particularly, to performance-based transforming of access policies in computer systems.

BACKGROUND

Distributed computer systems, such as enterprise-based computer systems, may have many thousands of users, each having access to one or more resources. Resources can include a particular computer, computer system, website, virtual machine, application, container, printer, and/or other resource. There are various types of access that can be granted. Examples include read access, write access, admin access, and others.

Access control policies, in general, are based on the concepts of subjects, objects, operations, and privileges. A subject is an actor (e.g., a user, service, or other entity that needs access to computer resources) that is trying to perform an action on an object. An object is a resource that needs to be protected from unauthorized use (e.g., a computer, a database, a printer, and/or the like). An operation is any action a subject might carry out on an object (e.g., read, write, etc.), and different operations may be relevant on different kinds of objects. A privilege is the permission for a user to perform a certain operation on a specified object.

Attribute Based Access Control (ABAC) is a paradigm used to manage the access of multiple users to multiple resources. Attributes may be considered characteristics of anything that may be defined and to which a value may be assigned. In its most basic form, ABAC relies upon the evaluation of attributes of the subject (e.g., a user, service, or other entity that needs access to computer resources), attributes of the object, environment conditions, and a formal relationship or access control rule defining the allowable operations for subject-object attribute and environment condition combinations.

SUMMARY

In one embodiment, there is provided a computer-implemented method for access policy data optimization, comprising: obtaining an initiation message; obtaining an original set of access data, wherein the original set of access data comprises a plurality of access policies; computing an access control health metric on the original set of access data, and in response to the access control health metric falling below a predetermined threshold: performing a policy subgroup mapping to identify at least one subgroup; converting each subgroup of the at least one subgroup that exceeds a predetermined size to an access group; and removing each access policy that is referenced in the converted subgroups.

In another embodiment, there is provided an electronic computation device comprising: a processor; a memory coupled to the processor, the memory containing instructions, that when executed by the processor, cause the electronic computation device to: obtain an initiation message; obtain an original set of access data, wherein the original set of access data comprises a plurality of access policies; compute an access control health metric on the original set of access data, and in response to the access control health metric falling below a predetermined threshold: perform a policy subgroup mapping to identify at least one subgroup; convert each subgroup of the at least one subgroup that exceeds a predetermined size to an access group; and remove each access policy that is referenced in the converted subgroups.

In another embodiment, there is provided a computer program product for an electronic computation device comprising a computer readable storage medium having program instructions embodied therewith, the program instructions executable by a processor to cause the electronic computation device to: obtain an initiation message; obtain an original set of access data, wherein the original set of access data comprises a plurality of access policies; compute an access control health metric on the original set of access data, and in response to the access control health metric falling below a predetermined threshold: perform a policy subgroup mapping to identify at least one subgroup; convert each subgroup of the at least one subgroup that exceeds a predetermined size to an access group; and remove each access policy that is referenced in the converted subgroups.

BRIEF DESCRIPTION OF THE DRAWINGS

FIG. 4 is a flowchart indicating process steps for embodiments of the present invention.

Figure 1:
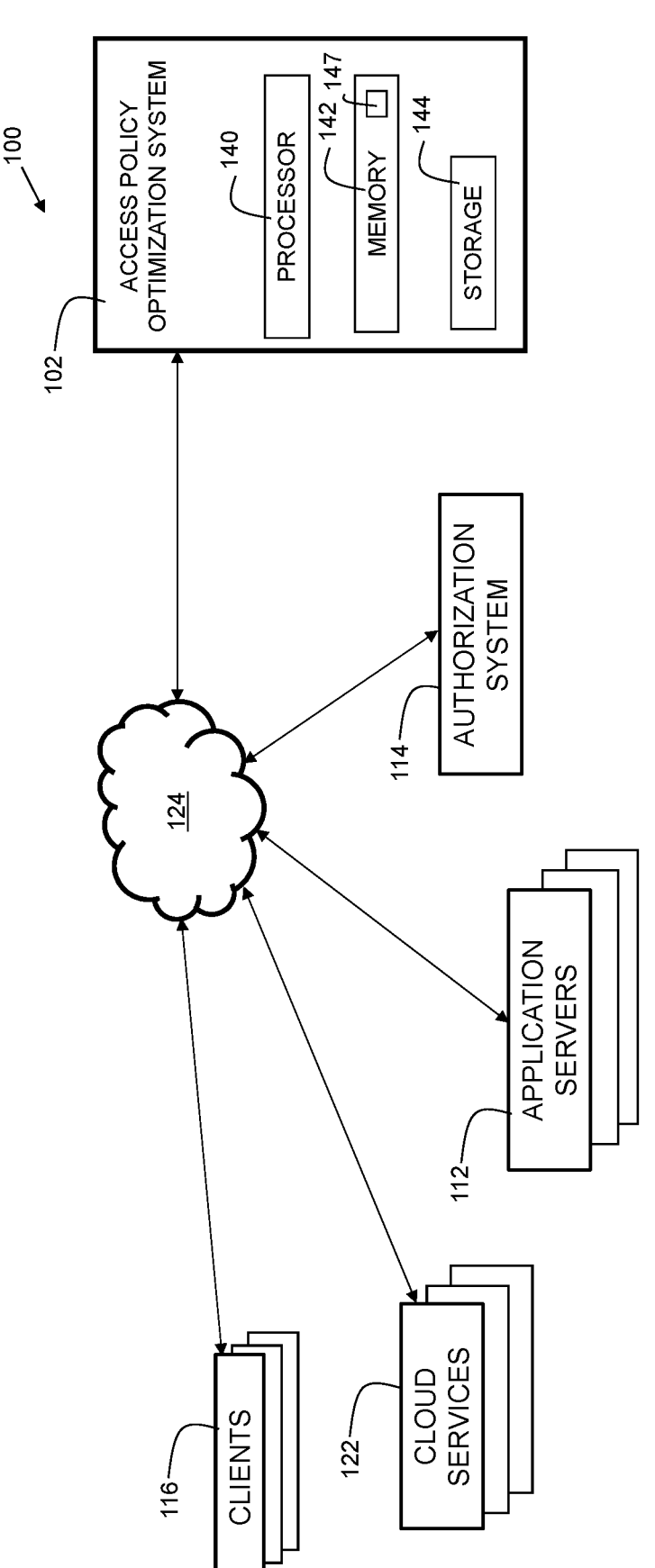
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Over the course of time, as people join and leave an organization, and new computer resources are added to an enterprise computer system, the number of access policies can grow astronomically. In many situations, an administrator is reluctant to manually optimize policies for concern of making a mistake that could lead to incorrect access privileges. The result is, over time, there can be many thousands of redundant and/or duplicative access policies. This 'policy bloat' has a tangible cost associated with it. Often, systems have finite limits for the number of access policies. Furthermore, a large number of redundant access policies can slow performance, increase login/access times, and consume precious CPU cycles of servers as well as other vital computing resources, such as memory and network bandwidth.

Disclosed embodiments provide systems and methods for analyzing and optimizing access policies. Access policies are analyzed by an access policy optimization system. Where feasible, equivalent access policies amongst multiple users are converted to an access group. In cases where a large number of users have similar access privileges, the number of overall policies can be significantly reduced. An access control health metric is computed on an original set of access data. The access control health metric can be used to assess the current state of the access system. It can provide an indication as to if optimization of the access policies is warranted.

The access data can include access policies and/or access groups. A policy subgroup mapping process is performed to identify subgroups of access policies. Subgroups with a number of entries exceeding a predetermined value are converted to access groups, the users that have those policies are added to the corresponding access groups, and the individual access policies are then deleted. Additionally, duplicative and/or redundant policies are identified and removed. Thus, disclosed embodiments simplify access policy management, and improve computer performance and conserve computer resources by reducing the number of access policies while preserving access rights for all subjects within the system.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is an environment 100 for embodiments of the present invention. Access Policy Optimization System (APOS) 102 comprises a processor 140, a memory 142 coupled to the processor 140, and storage 144. System 102 is an electronic computation device. The memory 142 contains program instructions 147, that when executed by the processor 140, perform processes, techniques, and implementations of disclosed embodiments. Memory 142 may include dynamic random-access memory (DRAM), static random-access memory (SRAM), magnetic storage, and/or a read only memory such as flash, EEPROM, optical storage, or other suitable memory and should not be construed as being a transitory signal per se. In some embodiments, storage 144 may include one or more magnetic storage devices such as hard disk drives (HDDs). Storage 144 may additionally include one or more solid state drives (SSDs). The APOS 102 is configured to interact with other elements of environment 100. APOS 102 is connected to network 124, which can be the Internet, a wide area network, a local area network, and/or other suitable network.

Environment 100 may include one or more client devices, indicated as 116. Client device 116 can include a laptop computer, desktop computer, tablet computer, smartphone, and/or other suitable computing device. Client device 116 may be used to configure APOS 102.

Environment 100 may include an authorization system 114. The authorization system may include one or more computers, virtual machines, and/or containerized applications that store and implement ABAC. Policies for individual users, and access groups may be stored on authorization system 114 as JSON files, XML files, yaml files, and/or other suitable representations. The authorization system 114 may perform access control functions, and/or interface with other access control components such as an LDAP server, Kerberos server, Active Directory server, and/or other suitable components.

Environment 100 may include one or more cloud services, indicated generally as 122. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Environment 100 may include one or more application servers, indicated generally as 112. The application servers 112 may use one or more of the cloud services 122. Similar to an individual user, applications also have access that is managed by access policies and/or access groups.

Figure 2B:
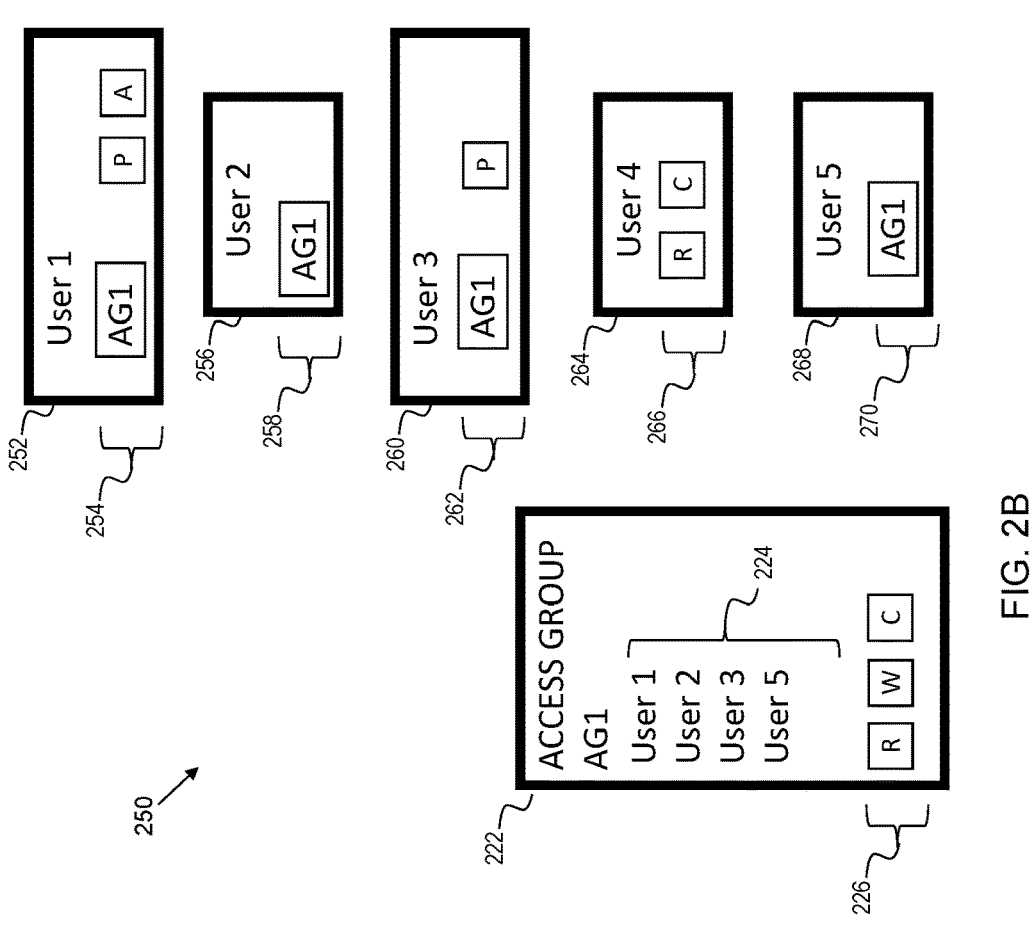
FIG. 2B shows an example of policy reduction using access groups.
Figure 2A:
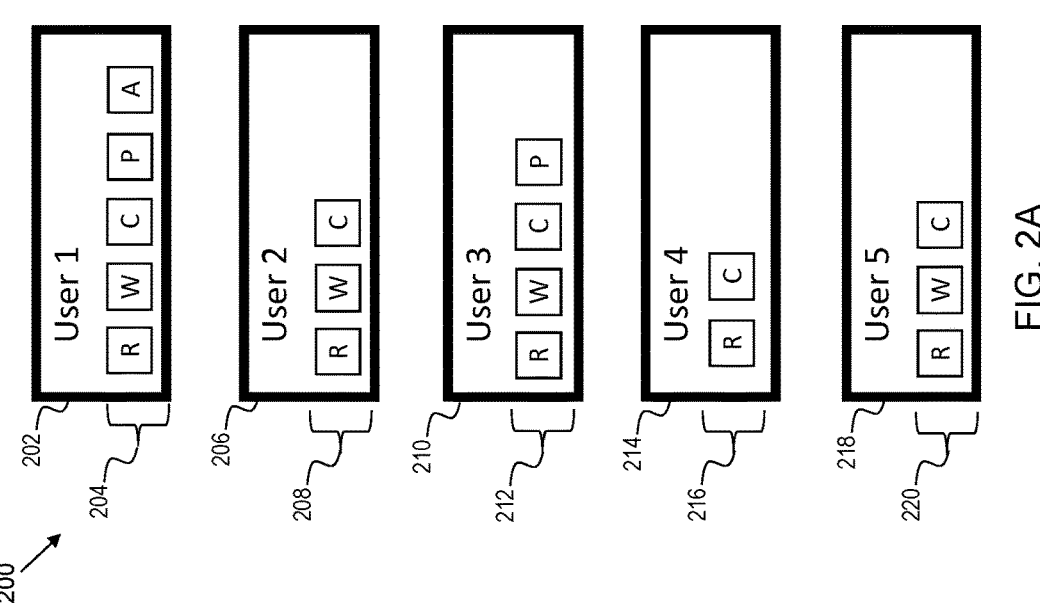
FIG. 2A shows an example of redundant policies.

FIG. 2A and FIG. 2B show an example of policy reduction using access groups. FIG. 2A shows an example 200 of redundant policies. FIG. 2A shows access policy data records for five users. User 1, indicated as 202, has policies 204. User 1 has five policies, indicated as R (read), W (write), C (copy), P (print), and A (admin). These policies are exemplary, and other embodiments may use more, fewer, and/or different policies. User 2, indicated as 206, has policies 208. User 2 has three policies, indicated as R (read), W (write), and C (copy). User 3, indicated as 210, has policies 212. User 3 has four policies, indicated as R (read), W (write), C (copy), and P (print). User 4, indicated as 214, has policies 216. User 4 has two policies, indicated as R (read), and C (copy). User 5, indicated as 218, has policies 220. User 5 has three policies, indicated as R (read), W (write), and C (copy). As can be seen in FIG. 2A, all users (User 1-User 5) have R (read), W (write), and C (copy) privileges. Embodiments identify this commonality and form a subgroup. The subgroup can include the list of privileges, and the list of users associated with those privileges. The subgroup can be converted to an access group in order to reduce the overall number of access policies in use.

FIG. 2B shows an example 250 of policy reduction using access groups. As can be seen in FIG. 2B, an access group AG1, indicated as 222, is part of the policy data of FIG. 2B. The access group AG1 has a member list 224, which includes User 1, User 2, User 3, and User 5. The access group AG1 has policies 226. Access group AG1 has three policies, indicated as R (read), W (write), and C (copy). User 4 is not included in access group 222, since the corresponding policies indicated at 216 do not match the policies 226 with the access group 222.

Returning again to FIG. 2A, it can be seen that amongst the access data for the five users (User 1-User 5), there are a total of 17 policies. In embodiments, the APOS 102 (FIG. 1), performs operations to convert the access policies shown in FIG. 2A, to that shown in FIG. 2B, without making any functional changes to the access privileges for each user. In this example, the APOS determined that User 1 (202), User 2 (206), User 3 (210), and User 5 (218), all had R (read), W (write), and C (copy) policies. The APOS 102, as part of the access policy optimization process, created the access configuration shown in FIG. 2B, in which access group AG1 exists. User 1, indicated as 252, has an access group list 254, which includes access group 1. Similarly, user 2, indicated as 256, has an access group list 258, which includes access group 1. Similarly, user 3, indicated as 264, has an access group list 266, which includes access group 1. Similarly, user 5, indicated as 268, has an access group list 270, which includes access group 1. User records can include both access groups, as well as individual access policies. As can be seen in FIG. 2B, user 1, indicated as 252, includes access control list 254, which includes access group AG1, and policies P (print), and A (admin). Similarly, user 3, indicated as 260, includes access control information 262, which includes access group AG1, and policy P (print).

Comparing the number of policies and/or access groups between FIG. 2A and FIG. 2B, it can be seen that while there are 17 policies in FIG. 2A, there are a total of nine policies/access groups amongst the access data for the five users. Thus, the number of policies is considerably reduced, while the access privileges of each user have been maintained after the optimization shown in FIG. 2B. In other words, each user (User 1-User 5) has the same privileges in the post-optimization scenario of FIG. 2B, as was in the pre-optimization scenario of FIG. 2A. Thus, disclosed embodiments can optimize policies while leaving access privileges unchanged from their pre-optimization status.

Figure 3B:
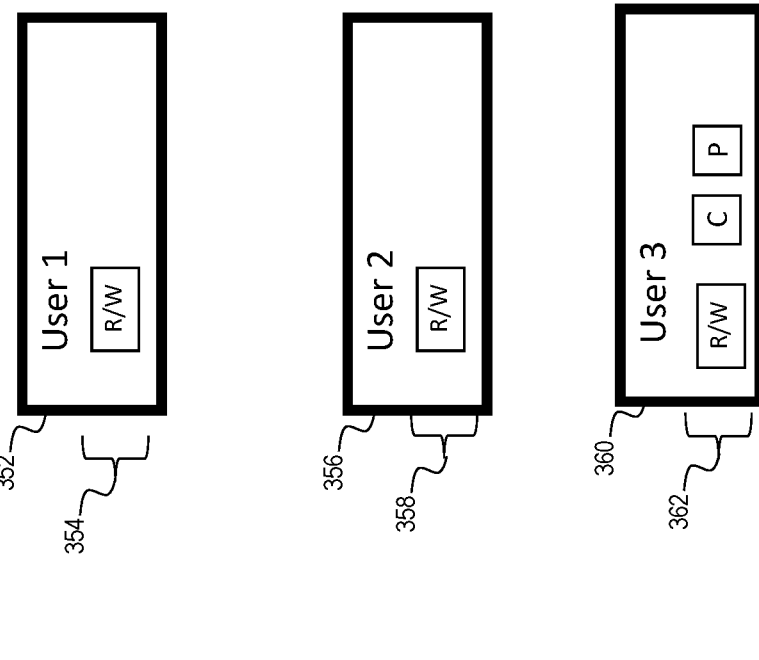
FIG. 3B shows an example of policy reduction using redundancy identification.
Figure 3A:
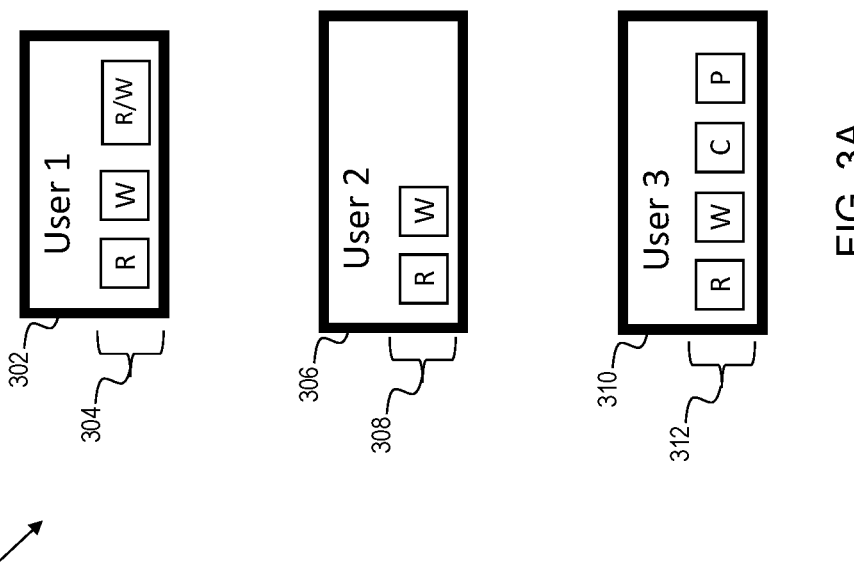
FIG. 3A shows another example of redundant policies.

FIG. 3A shows another example 300 of redundant policies. FIG. 3B shows an example 350 of policy reduction using redundancy identification. FIG. 3A shows access policy data records for three users. User 1, indicated as 302, has policies 304. User 1 has three policies, indicated as R (read), W (write), and R/W (read and write). These policies are exemplary, and other embodiments may use more, fewer, and/or different policies. User 2, indicated as 306, has policies 308. User 2 has two policies, indicated as R (read), and W (write). User 3, indicated as 310, has policies 312. User 3 has four policies, indicated as R (read), W (write), C (copy), and P (print).

In embodiments, as part of the policy optimization process, the APOS 102 (FIG. 1) determines that the R/W policy covers the same permissions as the combination of the R (read) policy, and the W (write) policy. In some embodiments, bitmask operations on an attribute word may be used to determine overlapping privileges amongst access policies. The resulting optimized policy information is shown in FIG. 3B. In FIG. 3B, user 1, indicated as 352, has policies 354. User 1 has the R/W (read and write) policy, which covers the permissions granted by the individual R (read) and W (write) policies. Thus, the individual R (read) and W (write) policies have been removed in the optimized policy information shown in FIG. 3B. User 2, indicated as 356, has policies 358. User 2 has the R/W (read and write) policy, which covers the permissions granted by the individual R (read) and W (write) policies. User 3, indicated as 360, has policies 362. User 3 has the R/W (read and write) policy, which covers the permissions granted by the individual R (read) and W (write) policies. For user 3, the C (copy), and P (print) policies remain.

Comparing FIG. 3A and FIG. 3B, there are 9 policies in FIG. 3A, whereas there are only five policies in FIG. 3B, while the access permissions for each user are unchanged between the pre and post optimization scenarios. Thus, as can be seen, disclosed embodiments improve the technical field of enterprise-level computing by streamlining access policies, and removing redundant policies, thereby conserving precious computing resources such as CPU cycles, memory, and network bandwidth.

FIG. 4 is a flowchart 400 indicating process steps for embodiments of the present invention. At 450 an initiation message is obtained. The initiation message is used to start the optimization process. Embodiments include a variety of sources for the initiation message. In some embodiments, the initiation message source includes a user-interface event such as a button press, mouse click, or the like. In some embodiments, the initiation message occurs automatically in response to a condition within environment 100, such as total number of policies, total number of resources, total number of subjects or users, addition of a resource, addition of a subject, removal of a resource, removal of a subject, and/or other conditions. At 452, original access data is obtained. The original access data refers to the state of the access data prior to optimization. The access data can include access policies, access groups, resources, and subjects (actors).

At 454, an access control health metric is computed. In some embodiments, the access control health metric is a function of various parameters. In embodiments, the access control health metric M is computed as:

$$M = K_1 * F(P) + K_2 * F(G) + K_3 * F(S) + K_4 * F(C)$$

Where P is a measure of policy headroom, G is a measure of access group headroom, C is the compute power required to perform the analysis of policies, and S is the number of subjects (users and/or services) within the access control system. $K_1$, $K_2$, $K_3$ and $K_4$ are constants that can be used to fine-tune the value of M for a particular access control system. In some embodiments, the value of M is normalized to be within a given range (e.g., 0-100).

Compute power required 475 is a measure of the computer resources such as processor cycles, memory, network bandwidth, disk usage, and/or other resources needed to perform introspection and/or analysis of polices. In embodiments, the access control health metric is computed as a function of required computation power.

As an example, if an enterprise account has a significant number of individual access polices, but a small number of groups, then it may require a large amount of compute power to iterate through the list of policies in order to determine whether to grant a request or not.

Disclosed embodiments can perform an optimization to convert some of those individual access polices to groups such as depicted in FIG. 2B, then the compute resources are conserved since the APOS 102 only has to iterate through a small number of groups to determine whether to grant or not. This can save compute power, and in cases where compute power is a billable item, it can also save money for organizations.

Policy headroom 477 is a measure of the number of new policies the access control system can accept. Access group headroom 479 is a measure of the number of new access groups the access control system can accept. Access control systems may have upper limits for the number of access policies and access groups. When an access control system approaches the upper limits, it can result in a lower access control health metric. The lower access control health metric can be used to automatically initiate a policy optimization process, or indicate to an administrator that policy optimization is warranted. In embodiments, the access control health metric is computed as a function of policy headroom. In embodiments, the access control health metric is computed as a function of access group headroom.

The number of actors within an access control system may also be used as a factor for determining the access control health metric. In some embodiments, a change in the number of actors above a predetermined threshold may automatically trigger an access policy optimization process. As an example, when an organization hires a group of new employees, as part of an onboarding process, new user accounts are created, and policies may be assigned to each user. If the group is over a predetermined size (e.g., over 100), then an automatic access control policy optimization process is initiated. This automatic access control policy optimization process identifies and creates access control groups, as depicted in FIG. 2A and FIG. 2B, and removes redundant policies, as depicted in FIG. 3A, and FIG. 3B. Thus, disclosed embodiments offload the cumbersome task of access policy management from administrators.

At 456, a policy subgroup mapping process is performed. This process identifies redundant access policies. In embodiments, the policy subgroup mapping is performed using a greedy cover set process. Set covering address the issue of, for a given collection of elements, attempting to find the minimum number of sets that incorporate (cover) all of these elements. Greedy algorithms can be used to approximate for optimal or near-optimal solutions for large scale set covering instances in polynomial solvable time. In embodiments, the greedy cover set process is applied to the list of policies to find the minimum number of policies and/or access groups that can be assigned to subjects in order to preserve access privileges. A feature of disclosed embodiments is that there is no change in access privilege between pre-optimized and post-optimized access control policies.

At 458, subgroups are converted to access control groups. In some embodiments, a predetermined threshold of group size is used as a criterion for the conversion. As an example, if a subgroup size is over 50, then it may be deemed worthwhile to convert that subgroup to an access group. At 460, the individual access policies that were referenced by converted subgroups (at 458) are now handled by an access group. Therefore, these access policies are removed, thereby reducing the overall number of access policies. This reduces 'policy bloat' while maintaining consistent access privileges for users and services. In embodiments, in response to the access control health metric M falling below a predetermined threshold (e.g., M<80), the processes indicated in FIGS. 4-7 are automatically performed.

Figure 5:
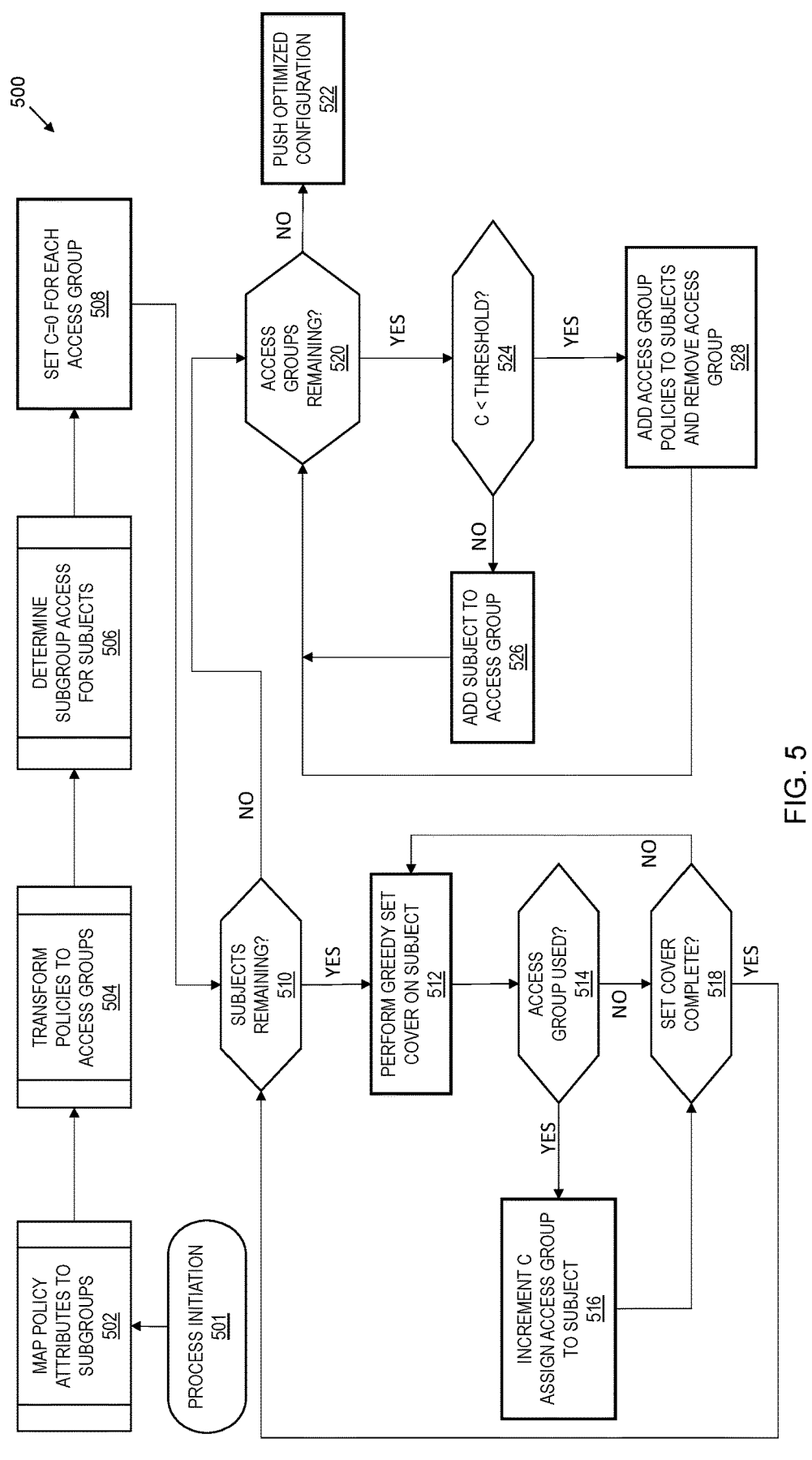
FIG. 5 is a flowchart indicating process steps for additional embodiments of the present invention.

FIG. 5 is a flowchart 500 indicating process steps for additional embodiments of the present invention. At 501, there is a process initiation. The process initiation can be predicated on an event. In some embodiments, the event is a user-interface event, such as button press or mouse click. In some embodiments, the event can be an automatically generated event from the APOS 102 (FIG. 1). The event can be based on an access control health metric falling below a predetermined value. As an example, in response to an access control health metric value falling below 90, an access policy optimization process can be automatically initiated by the APOS 102.

In embodiments, the initiation message is generated in response to a value of the policy health metric. In embodiments, the initiation message is generated in response to an addition of a subject. In embodiments, the initiation message is generated in response to an addition of a resource. In embodiments, the initiation message is generated in response to removal of a subject. In embodiments, the initiation message is generated in response to removal of a subject.

At 502, policy attributes are mapped to subgroups. At 504, policies are transferred to access groups. This starts with the creation of subgroups for common sets of access policies. The subgroups denote a relationship between the policies, as well as subjects that have those policies. At 506 subgroup access for subjects is determined. At 508 a counter C is initialized to zero to process access groups and subjects. At 510 a check is made to determine if there are more subjects to process. If yes at 510, then a greedy set cover is performed for the subject at 512. At 514 a check is made to determine if an access group can be used in place of multiple individual access policies. If yes at 514, then the counter C is incremented and the access group is assigned to the subject at 516. The process then continues to 518, where a check is made to determine if the set cover process is complete. If no at 514, the process also continues to 518. If no at 518, then the process returns to 512 to continue with the greedy set cover process. If yes at 518 then the process returns to 510.

If no at 510, then the process continues to 520, where a check is made to determine if access groups are remaining. If yes at 520, a check is made to determine if C is less than a predetermined threshold at 524. If no at 524 then the subject is added to the access group at 526. If yes at 524, then individual access policies are given to subjects and corresponding access groups are removed. Since access groups have a certain amount of overhead associated with them, this path enables creating individual access policies in situations where overhead of an access group outweighs its benefits.

If no at 520, then the optimized configuration is pushed at 522. In embodiments, this entails the APOS 102 (FIG. 1) sending information to the authorization system 114. The information can be in the form of JSON files, XML files, execution of RESTful APIs, and/or other suitable techniques. With the reduction in overall access policies, while preserving access for each subject, the overall performance of enterprise-level computing systems is improved. Additionally, cost and utilization of key computer resources such as network bandwidth, CPU cycles, and memory usage are reduced.

Figure 6B:
FIG. 6B is a flowchart indicating process steps for policy transformation in accordance with embodiments of the present invention.
Figure 6B:
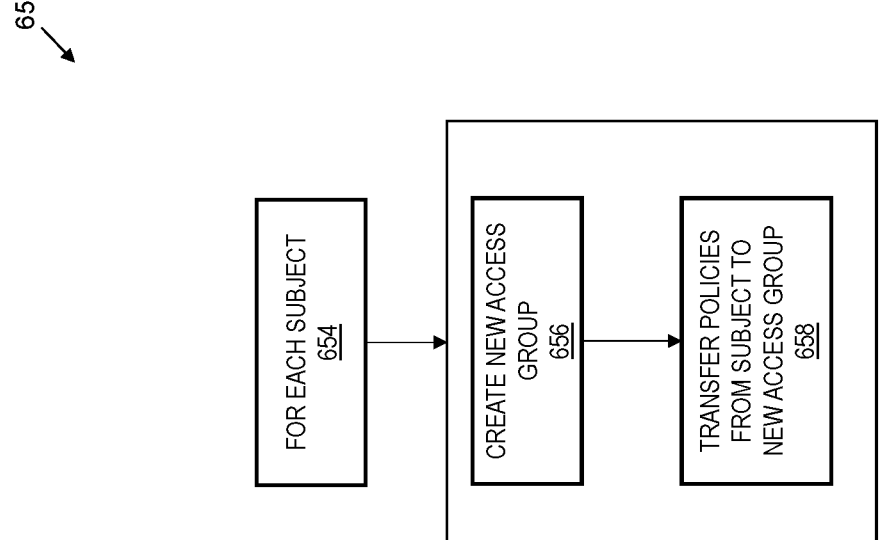
Figure 6A:
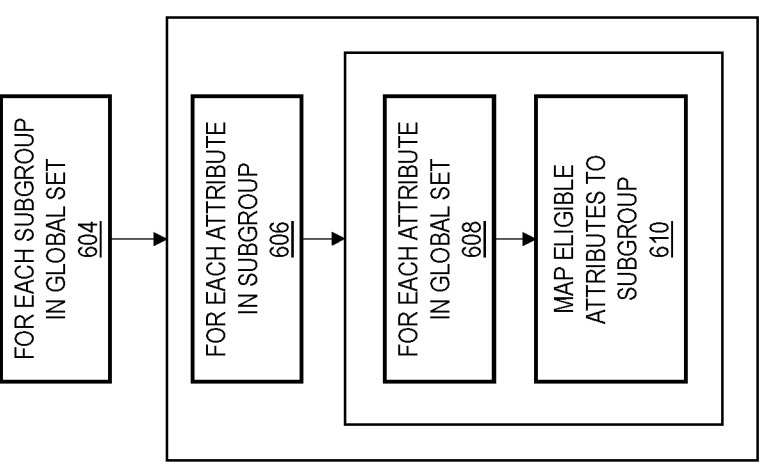
FIG. 6A is a flowchart indicating process steps for policy attribute mapping in accordance with embodiments of the present invention.

FIG. 6A is a flowchart 600 indicating process steps for policy attribute mapping in accordance with embodiments of the present invention. At 604, for each subgroup in a global set, for each attribute in subgroups 606, for each attribute within the global set 608, eligible attributes are mapped to a subgroup at 610. This iterative process may be implemented via nested-loop constructs using a programming language such as Python, Java, C, C++, or other suitable language.

FIG. 6B is a flowchart 650 indicating process steps for policy transformation in accordance with embodiments of the present invention. At 654, for each subject in an access control system, a new access group is created at 656, and individual access policies from the subject are added to the new access group at 658. This iterative process may be implemented via nested-loop constructs using a programming language such as Python, Java, C, C++, or other suitable language. Once the creation of the access group is complete, the access group is assigned to the corresponding subjects, and the individual access policies that the access group includes are deleted, thereby reducing policy bloat and improving efficiency and performance of the access control.

Figure 7:
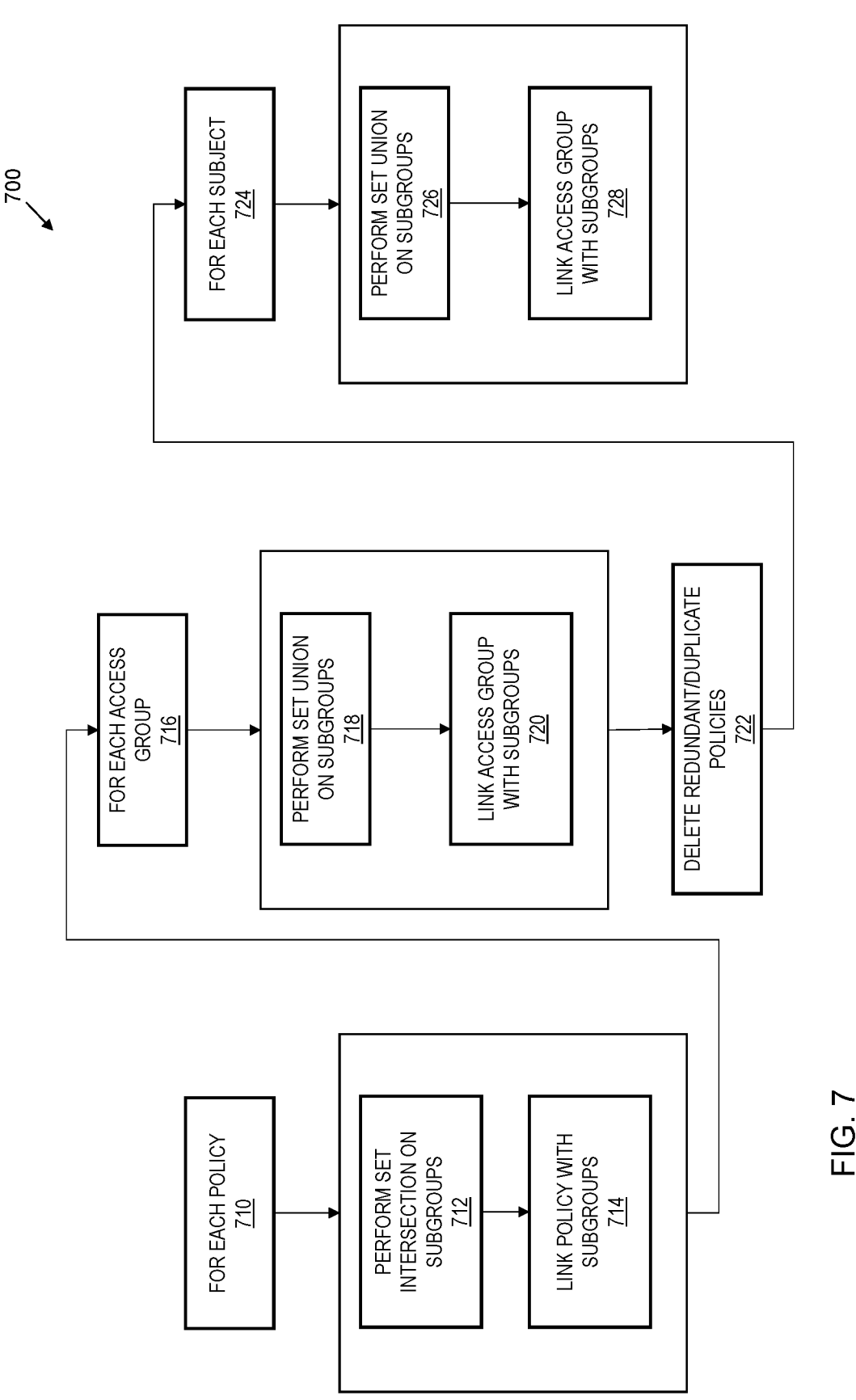
FIG. 7 is a flowchart for subgroup access determination in accordance with embodiments of the present invention.

FIG. 7 is a flowchart 700 for subgroup access determination in accordance with embodiments of the present invention. For each policy 710, a set intersection with subgroups is performed at 712. Eligible policies are linked with the corresponding subgroups at 714. For each access group 716, a set union on subgroups is performed at 718, and access groups are linked with corresponding subgroups at 720. In embodiments, not all subgroups are promoted to access groups. Disclosed embodiments may utilize a predetermined subgroup size to determine if the savings of an access group exceeds an overhead/cost associated with that access group.

At 722, redundant and/or duplicate policies are deleted. At 724, for each subject, a set union is performed on subgroups at 726, and access groups are linked with corresponding subgroups at 728. This iterative process may be implemented via nested-loop constructs using a programming language such as Python, Java, C, C++, or other suitable language. Disclosed embodiments can reduce the overall number of access policies while preserving access privileges of the subjects, thereby improving the overall efficiency of enterprise-level computing systems.

Figure 8:
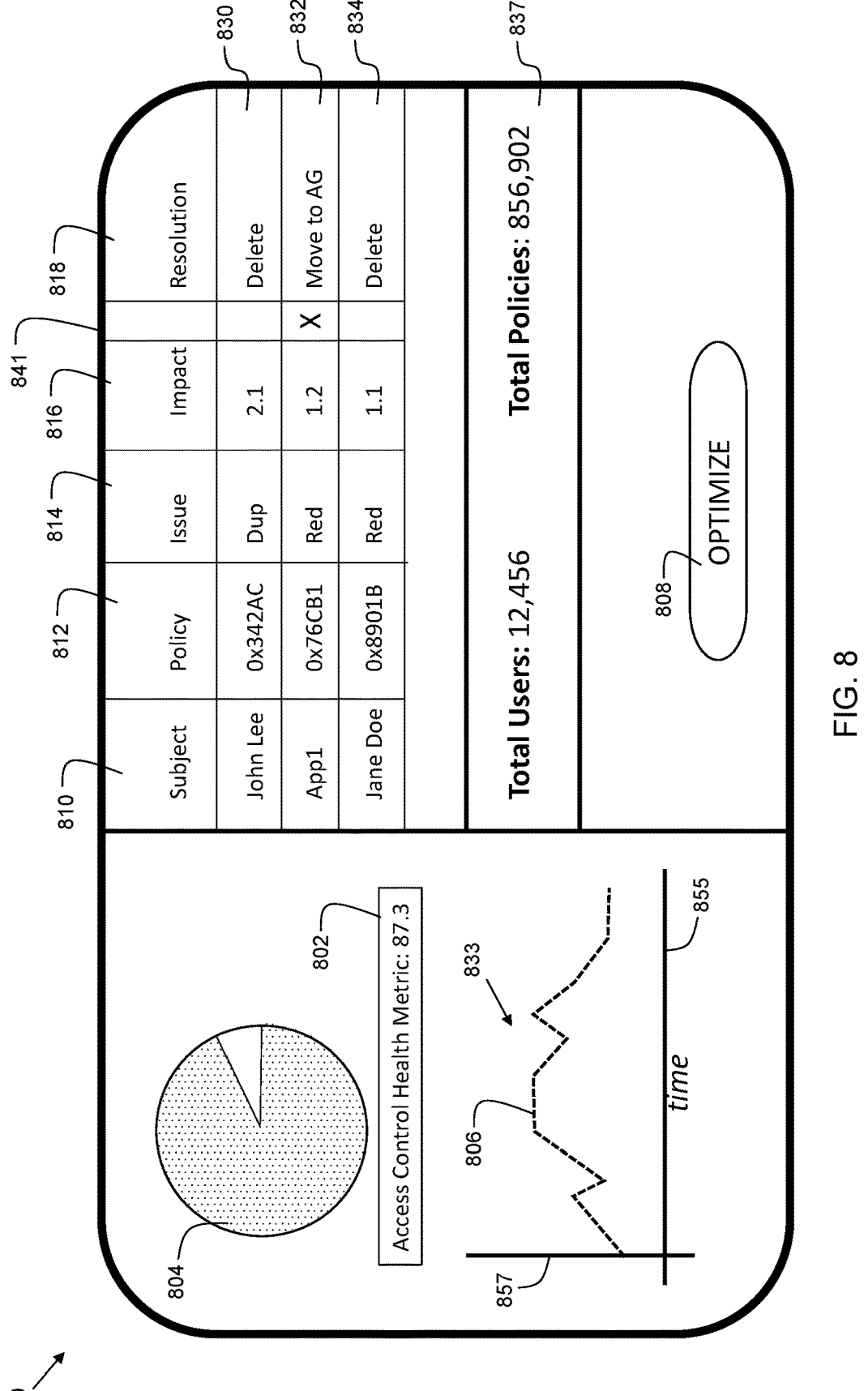
FIG. 8 is an exemplary user interface in accordance with embodiments of the present invention.

FIG. 8 is an exemplary user interface 800 in accordance with embodiments of the present invention. The user interface 800 can be rendered on an electronic display. In embodiments, the electronic display is part of a client device (e.g., 116 of FIG. 1), or directly coupled to APOS 102 (FIG. 1). The user interface 800 may include a field 802 for display of an access control health metric value. Embodiments may also include a graphical element 804 to represent the value of the access control health metric. In some embodiments, the graphical element 804 may include a pie chart, bar chart, or other suitable graphical representation.

Embodiments may include a graph 833. The graph 833 may include a curve 806 representing the value of the access control health metric along vertical access 857 over time, which is represented along horizontal access 855. The graph 833 can provide administrators and other stakeholders with vital temporal information about the state of the access control health.

Embodiments may include a grid display with multiple rows and columns. Column 810 indicates a subject. A subject can be a user account, and/or an application or other service that needs access control. Column 812 indicates a policy identifier. In embodiments, the policy identifier may be an alphanumeric string, hexadecimal value, and/or other suitable representation. Column 814 indicates an issue. The issue can be a reason why an access policy is to be removed as part of an optimization process.

Reasons can include duplicity and/or redundancy. In some embodiments, other reasons may also be included. Column 816 indicates an impact. The impact represents an improvement in the access control health metric that may be obtained by optimizing a particular access policy. Column 818 indicates a resolution. The resolution can include deletion, and/or transferring the access policy to an access group.

In the example of FIG. 8, there are three rows, indicated as 830, 832, and 834. Each row indicates an access policy eligible for removal as a result of optimization. An administrator can press, click, or otherwise select the optimize button 808 to generate an initiation message/event to start the access policy optimization process depicted in FIGS. 4-7. In some embodiments, the user interface 800 provides an ability to select a particular policy for exclusion from the optimization process. Column 841 indicates exclusion selection. In the example shown, at row 832, column 841, there is an 'X' which is entered by the administrator via the user interface (e.g., via mouse click). This can exclude the policy indicated by row 832 for optimization. In some embodiments, by default, all eligible access policies may be selected for optimization. The feature to exclude a particular access policy from the optimization process may be useful in certain cases, such as when a major change to the number of resources and/or subjects is planned in the near future.

Field 837 provides additional summary information regarding access policies and groups. The information can include, but is not limited to, the total number of users, the total number of policies, the total number of access groups, the number of users added in the past week (or other suitable time periods), the number of users removed in the past week (or other suitable time periods), the number of resources added in the past week (or other suitable time periods), and the number of resources removed in the past week (or other suitable time periods). Other information can also be included in field 837 in disclosed embodiments. Some embodiments may further include recommendations for how to add access to a resource. As an example, the administrator may have an option to select the subject, resource, and type of access to add/remove. The optimization process may then determine the most efficient way to make the access change. In some embodiments, the APOS 102 generates a recommendation for the administrator to accept. An example of such a recommendation may appear in field 837 with text that says, for example, "access X to resource Y is already granted by Access Group M. Would you like to add subject Z to Access Group M instead?". Or alternatively, the recommendation may be to create an access group. An example of such a recommendation may be "Recommendation: creating a group for this access is more optimal. Would you like to go to the Access Group panel?". In some embodiments, the APOS 102 may automatically perform the access change, and report to the administrator how and/or why it made the change in a given manner.

As can now be appreciated, disclosed embodiments improve the technical field of Attribute Based Access Control (ABAC). Administrators are responsible for managing access and providing the right access to the right people. They do so by managing policies in a variety of ways. When policy creation and management is confusing, it can compromise the operations of an enterprise-level computing system. It can lead to data breaches, slower cloud services, and a suboptimal user experience. Disclosed embodiments provide visualization of the access control health that can provide details on the number of policies an administrator has created, how many users exist, and how many policies the given account can use. Additionally, disclosed embodiments enable an administrator to regain control of his/her access policies. In disclosed embodiments, a set cover algorithm analyzes all the policies in an account and make a series of recommendations based on this analysis. Thus, disclosed embodiments identify and eliminate redundancies and replace, when possible, with access groups. Disclosed embodiments implement the recommended changes and provide the administrators and/or other stakeholders with a summary of the actions taken.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for access policy data optimization, comprising:
   obtaining an initiation message;
   obtaining an original set of access data, wherein the original set of access data comprises a plurality of access policies;
   computing an access control health metric on the original set of access data, and in response to the access control health metric falling below a predetermined threshold;
   performing a policy subgroup mapping to identify at least one subgroup, wherein any policies are transferred to access groups;
   creating a plurality of subgroups for common sets of access policies, wherein subgroups denote a relationship between the policies, as well as subjects that have those policies;
   creating a counter C originally initialized to zero to process access groups and subjects;
   converting each subgroup of the at least one subgroup that exceeds a predetermined size to an access group using said counter C; and
   removing each access policy that is referenced in the converted subgroups.

2. The method of claim 1, further comprising:
   identifying redundant policies; and
   removing the identified redundant policies.

3. The method of claim 1, wherein the policy subgroup mapping is performed using a greedy cover set process.

4. The method of claim 1, wherein the access control health metric is computed as a function of policy headroom.

5. The method of claim 1, wherein the access control health metric is computed as a function of required computation power.

6. The method of claim 1, wherein the initiation message is generated in response to a value of the access control health metric.

7. The method of claim 1, wherein the initiation message is generated in response to an addition of a subject.

8. The method of claim 1, wherein the initiation message is generated in response to an addition of a resource.

9. The method of claim 1, wherein the initiation message is generated in response to removal of a subject.

10. The method of claim 1, wherein the initiation message is generated in response to removal of a resource.

11. An electronic computation device comprising:

a processor;

a memory coupled to the processor, a memory containing instructions, that when executed by the processor, cause the electronic computation device to: obtain an initiation message;

obtain an original set of access data, wherein the original set of access data comprises a plurality of access policies;

compute an access control health metric on the original set of access data, and in response to the access control health metric falling below a predetermined threshold:

perform a policy subgroup mapping to identify at least one subgroup, wherein any policies are transferred to access groups;

create a plurality of subgroups for common sets of access policies, wherein subgroups denote a relationship between the policies, as well as subjects that have those policies;

create a counter C originally initialized to zero to process access groups and subjects;

convert each subgroup of the at least one subgroup that exceeds a predetermined size to an access group using said counter C; and remove each access policy that is referenced in the converted subgroups.

12. The electronic computation device of claim 11, wherein the memory further comprises instructions, that when executed by the processor, cause the electronic computation device to:

identify redundant policies; and remove the identified redundant policies.

13. The electronic computation device of claim 11, wherein the memory further comprises instructions, that when executed by the processor, cause the electronic computation device to perform a policy subgroup mapping by a greedy cover set process.

14. The electronic computation device of claim 11, wherein the memory further comprises instructions, that when executed by the processor, cause the electronic computation device to compute the access control health metric as a function of policy headroom.

15. The electronic computation device of claim 11, wherein the memory further comprises instructions, that when executed by the processor, cause the electronic computation device to compute the access control health metric as a function of access group headroom.

16. A computer program product for an electronic computation device comprising a computer readable storage medium having program instructions embodied therewith, the program instructions executable by a processor to cause the electronic computation device to:

obtain an initiation message;

obtain an original set of access data, wherein the original set of access data comprises a plurality of access policies;

compute an access control health metric on the original set of access data, and in response to the access control health metric falling below a predetermined threshold:

perform a policy subgroup mapping to identify at least one subgroup, wherein any policies are transferred to access groups;

create a plurality of subgroups for common sets of access policies, wherein subgroups denote a relationship between the policies, as well as subjects that have those policies;

create a counter C originally initialized to zero to process access groups and subjects;

convert each subgroup of the at least one subgroup that exceeds a predetermined size to an access group using said counter C; and remove each access policy that is referenced in the converted subgroups.

17. The computer program product of claim 16, wherein a memory further comprises instructions, that when executed by the processor, cause the electronic computation device to:

identify redundant policies; and remove the identified redundant policies.

18. The computer program product of claim 16, wherein the computer readable storage medium includes program instructions executable by the processor to cause the electronic computation device to perform a policy subgroup mapping by a greedy cover set process.

19. The computer program product of claim 16, wherein the computer readable storage medium includes program instructions executable by the processor to cause the electronic computation device to compute the access control health metric as a function of policy headroom.

20. The computer program product of claim 16, wherein the computer readable storage medium includes program instructions executable by the processor to cause the electronic computation device to compute the access control health metric as a function of access group headroom.

* * * * *